United States Patent [19]

Kinzenbaw

[11] Patent Number: 4,721,168

[45] Date of Patent: Jan. 26, 1988

[54] AGRICULTURAL IMPLEMENT WITH RAISABLE LIFT FRAME ROTATABLE ABOUT VERTICAL AXIS

[76] Inventor: Jon E. Kinzenbaw, R.R. 1, Box 184, Williamsburg, Iowa 52361

[21] Appl. No.: 779,164

[22] Filed: Sep. 23, 1985

[51] Int. Cl.⁴ ............................................. A01B 73/00
[52] U.S. Cl. ..................... 172/311; 111/57; 172/466; 172/484; 172/625; 172/662; 280/411 A; 280/415 R
[58] Field of Search ............. 172/240, 248, 254, 311, 172/456, 625, 477, 466, 484, 662; 111/57; 280/401, 411 R, 411 A, 411 B, 411 C, 412, 413, 415 R, 463, 482, 656, 415 A; 56/228, 385

[56] References Cited

U.S. PATENT DOCUMENTS

| | | | |
|---|---|---|---|
| 3,767,231 | 10/1973 | Grosse-Rhode | 280/482 |
| 4,137,852 | 2/1979 | Pratt | 111/57 |
| 4,319,643 | 3/1982 | Carter et al. | 172/311 |
| 4,518,046 | 5/1985 | Rettig et al. | 172/311 |

FOREIGN PATENT DOCUMENTS

| | | | |
|---|---|---|---|
| 3150335 | 7/1983 | Fed. Rep. of Germany | 280/482 |
| 36403 | 9/1954 | Poland | 111/57 |
| 1001878 | 3/1983 | U.S.S.R. | 172/311 |

*Primary Examiner*—Richard T. Stouffer
*Attorney, Agent, or Firm*—Emrich & Dithmar

[57] ABSTRACT

An agricultural planter has a main carrier frame attached to a tractor by an hydraulically actuated telescoping tongue. Individual row units are mounted on a lift frame which in the illustrated embodiment has a center section and left and right wing sections. The wing sections are mounted to the center section for independent vertical pivotal motion relative to the center section in the use position. Power locks secure the wings rigidly to the center section for road transport. The lift frame is mounted to the carrier frame by a vertical pivot post and an hydraulically powered lift linkage. The pivot post may be rotated by an hydraulic cylinder under control of the operator. In the use position, the hitch tongue is retracted and the lift frame is lowered and extends transverse of the direction of travel. For transport, the tongue is extended, the lift frame is made rigid, then elevated by a master/slave cylinder arrangement which powers the lift linkage to a transport height, and then the lift frame rotated so that it extends in the direction of travel. The lift frame is then locked in that position for end-wise transport on the carrier frame.

25 Claims, 26 Drawing Figures

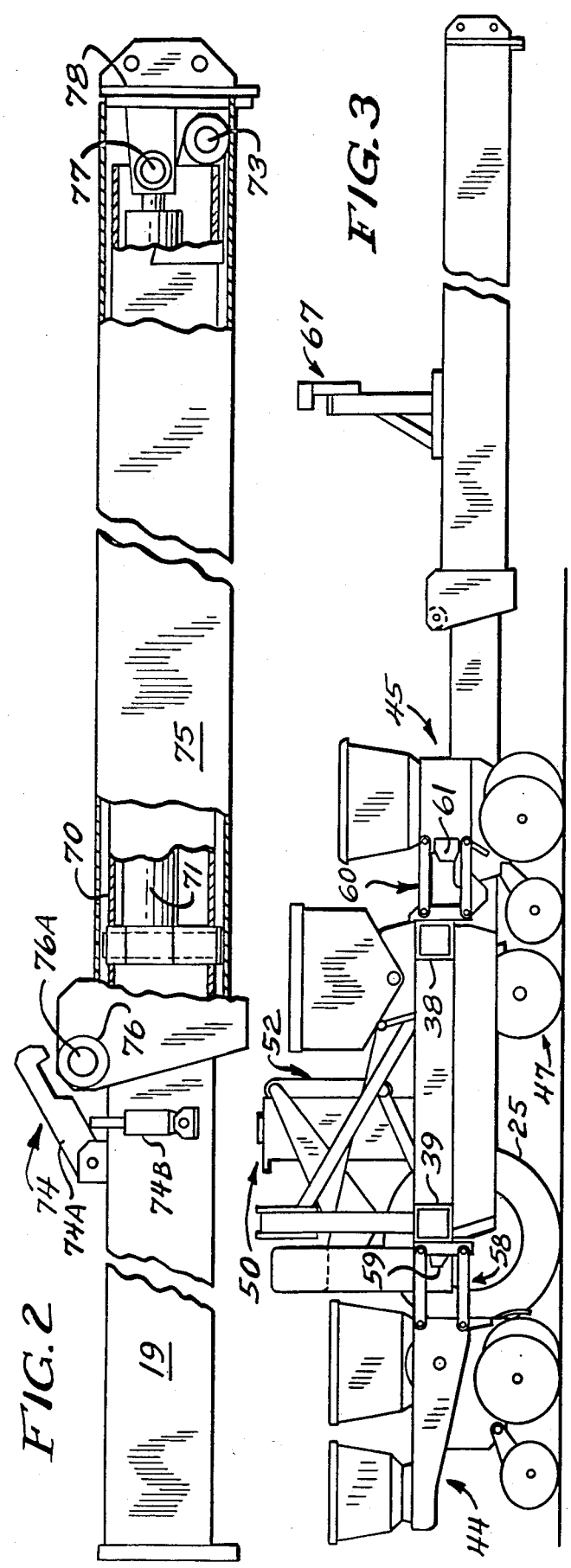
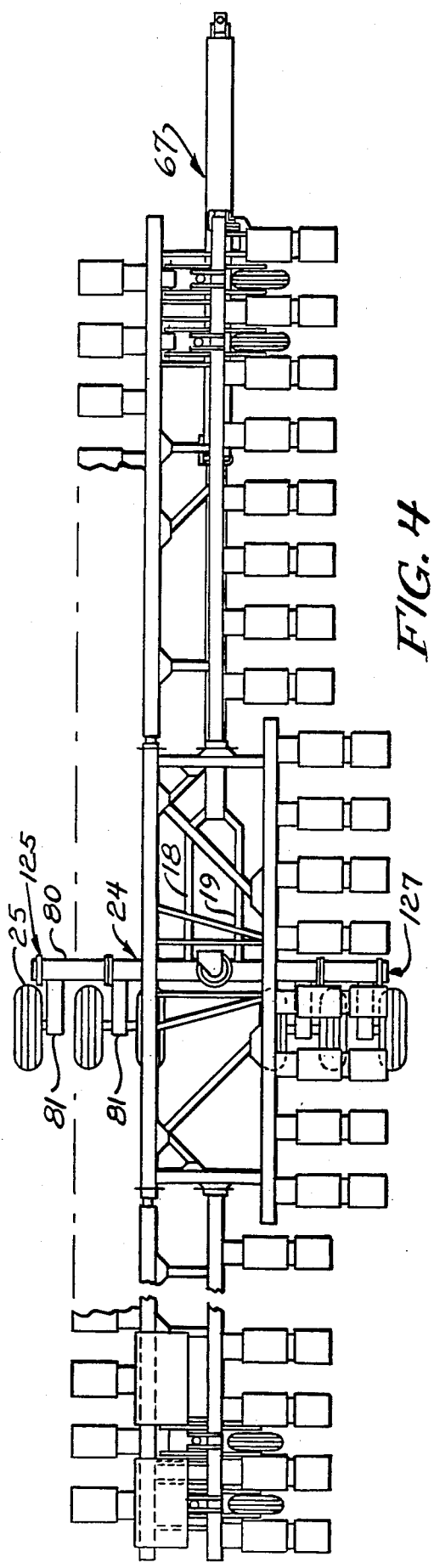

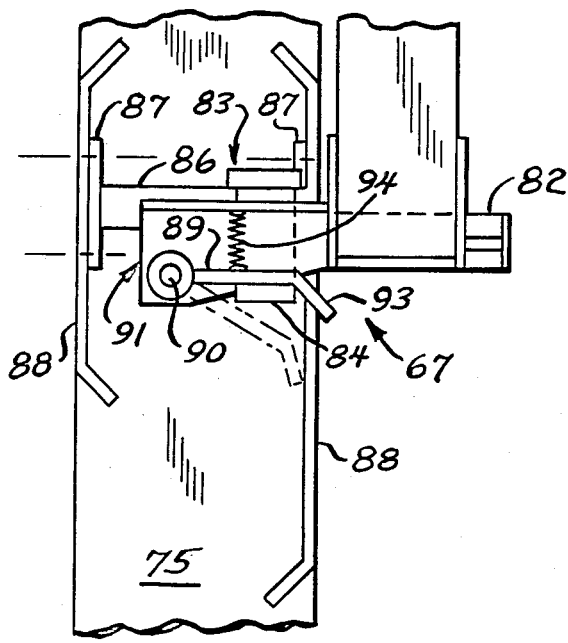
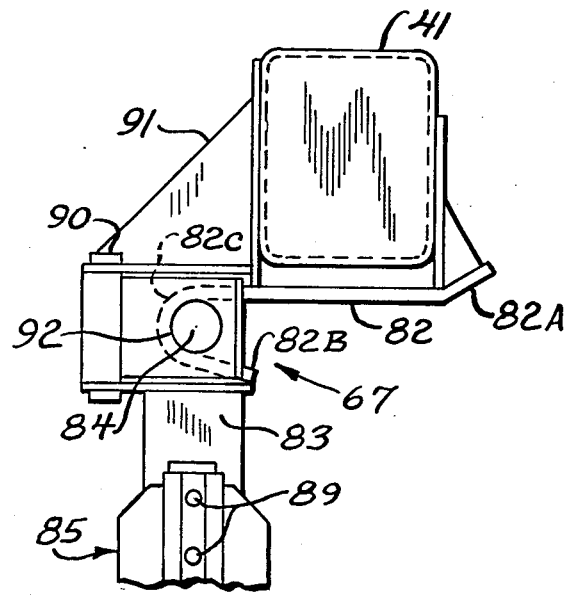
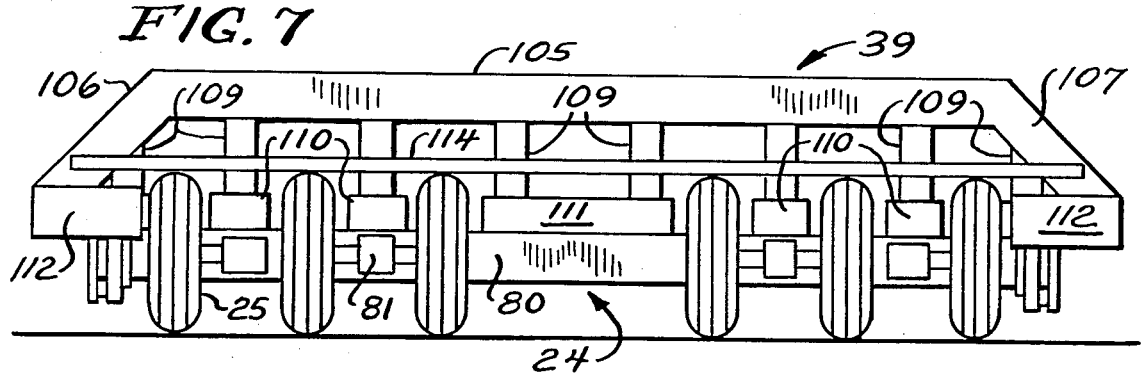
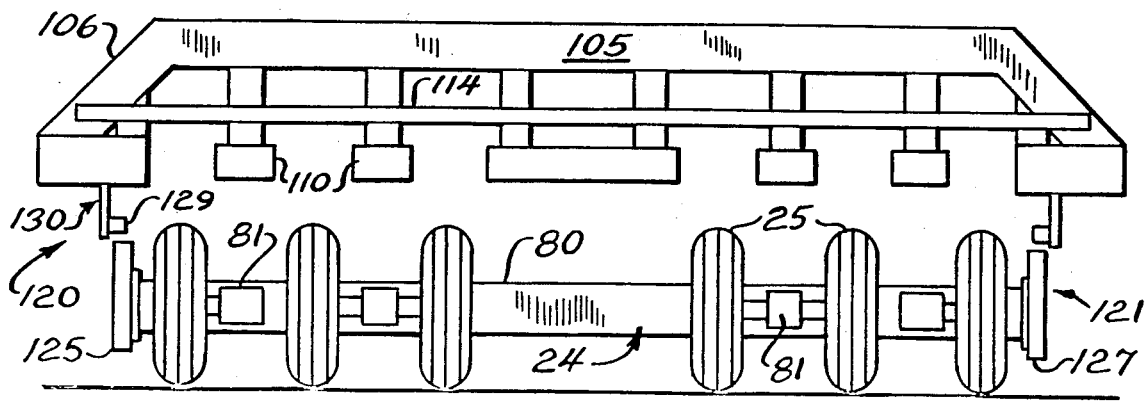

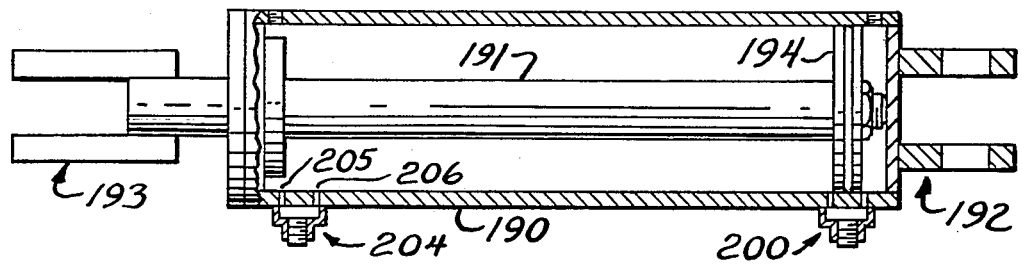
FIG. 14
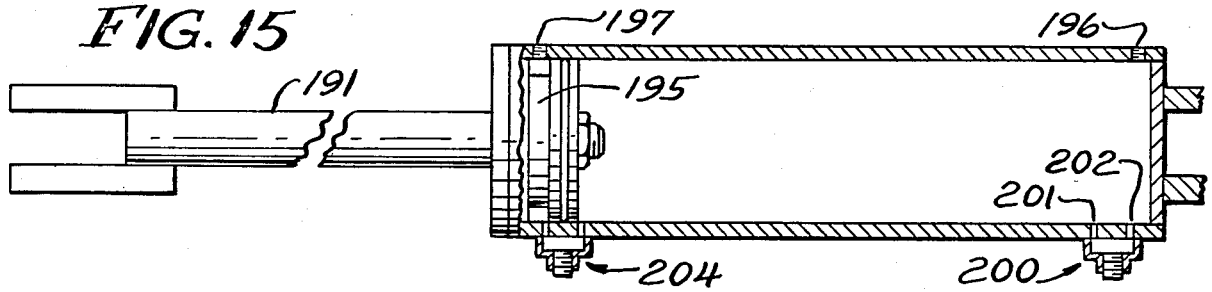
FIG. 15
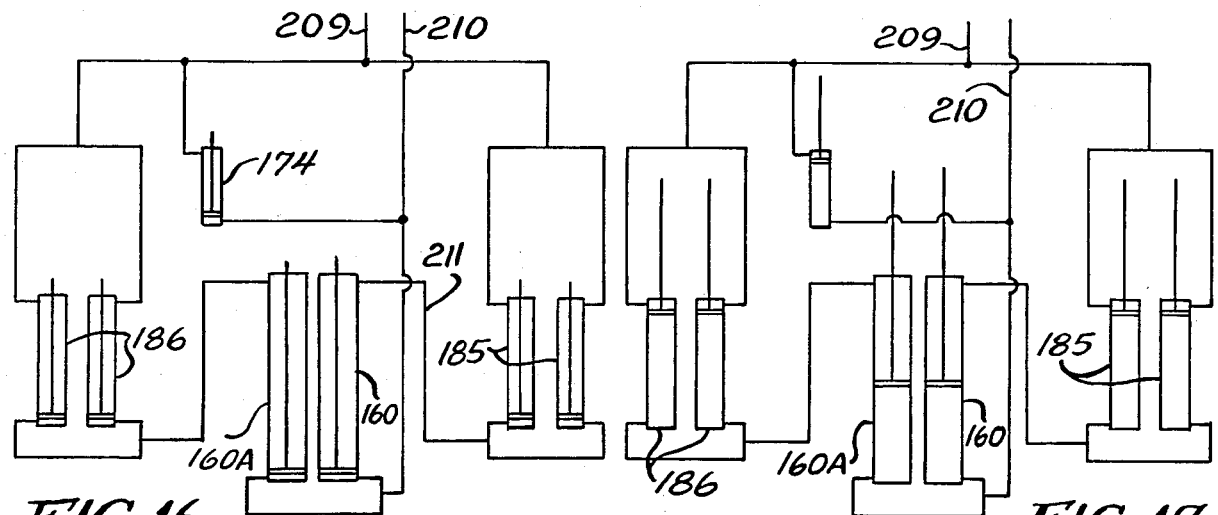
FIG. 16
FIG. 17
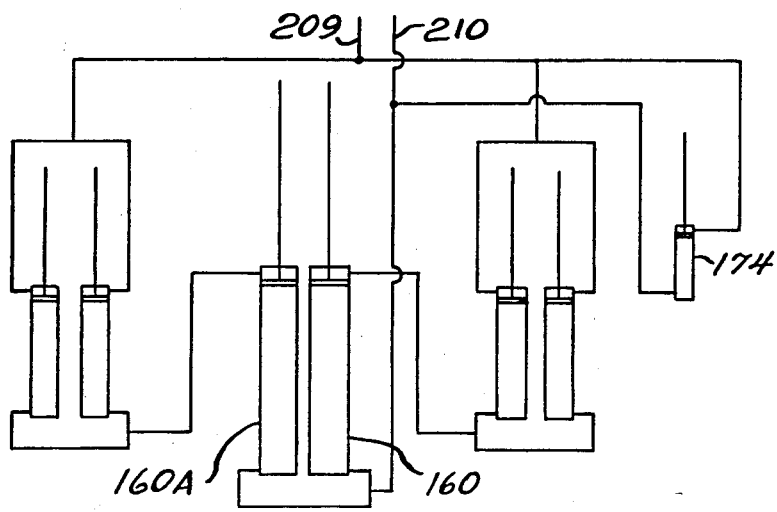
FIG. 18

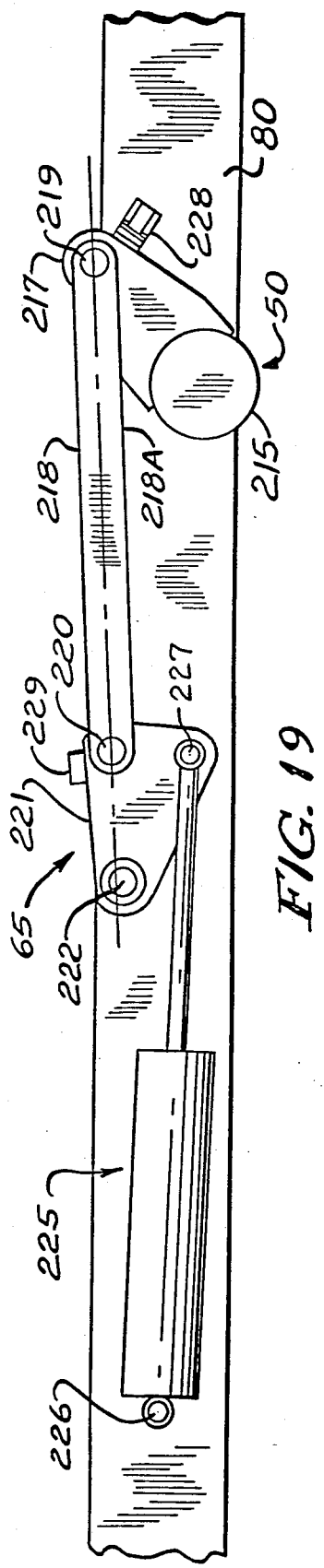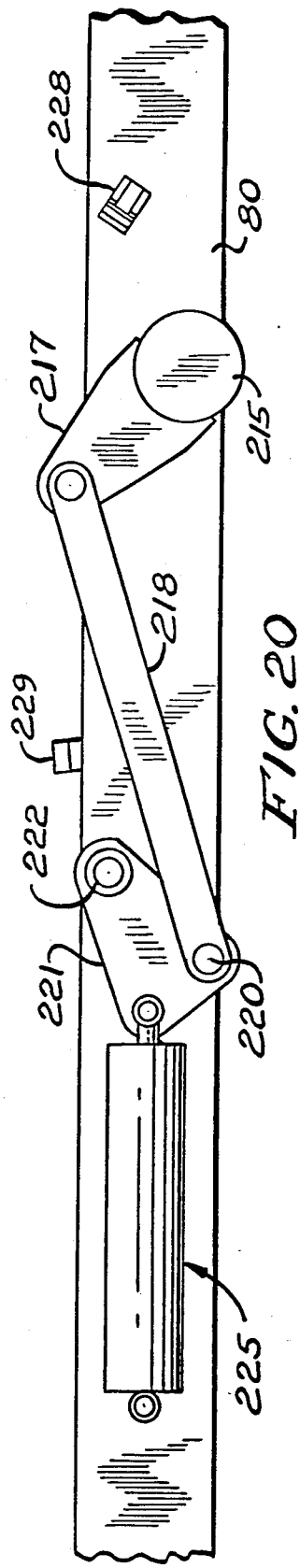

AGRICULTURAL IMPLEMENT WITH RAISABLE LIFT FRAME ROTATABLE ABOUT VERTICAL AXIS

BACKGROUND AND FIELD OF THE INVENTION

The present invention relates to agricultural implements, and particularly to large agricultural implements adapted to be pulled behind modern tractors. As tractor horsepower has increased, so have the width of farm implements they pull to take advantage of the larger horsepower of such tractors. By way of example, the invention is illustrated and described as embodied in a row crop planter having twenty-four individual planter row units and which may extend sixty-five feet or more in the use position.

One important consideration of such large implements is the mode and manner in which they are transported to and from the field. Obviously, such an implement cannot be transported over roads in the same position or configuration in which it is set up for field use. Some early planters required separate trailers for transport. In addition to the cost for these special-use transport trailers, these planters are limited in length by the practical requirements of having to load the implement on the trailer and to unload it. In addition, valuable time is wasted in loading the implement on the trailer to transport it to a second field, and then in setting up the implement in the new field because the tractor must be unhitched from the implement and then hitched to the trailer and the reverse procedure followed at the new site. This time can be critical in view of the short time normally available when good planting conditions prevail, especially when numerous fields must be planted by the same implement.

Other attempts to facilitate transport of larger implements include frames with wings which fold vertically at the outer ends of the wings on which the row units are mounted. Vertically folding structures may be acceptable for cultivators and the like, but even here there is a limitation on the height of the implement for getting it under bridges, through gates and into sheds. In the case of a planter, however, vertically folding wings have the disadvantage that when the hoppers are turned on their sides, the lids may come loose during transport thereby spilling seed or insecticide. Other folding configurations include one which folds the outer portions of the mounting bar forwardly, leaving the center portion fixed. Here, there are limitations on the configurations of planting equipment that may be employed. Additional practical limitations are imposed on the length and width of these implements and there are disadvantages in converting them between use and transport configurations.

One improvement in planter design is disclosed in my U.S. Pat. No. 4,117,893. This system permits the planter bar to fold rearwarly about its centerline, and links are used to lock the two side sections or wings either in the use position in which the mounting bars are aligned and transverse to the direction of travel of the tractor. The same links lock the wings in the transport position, in which the mounting bars for the two sets of row units are folded rearwardly and are parallel to the direction of travel of the tractor. This system proved successful because it was capable of being converted between the use and transport position by a single operator in a matter of only seconds, and because it enabled planters of sixteen or eighteen or even twenty-four row configurations to be designed. Such larger planters are particularly desirable to operators of greater acreage where, as mentioned, the time during which ideal planting conditions exist may be short. A limitation on this system is the limited configurations of row units that may be employed. For instance, so-called interplant units cannot readily be employed because folding the planter already doubles the normal fore-to-aft length of the system which, during transport becomes the width of the system.

Another improvement in planter design is represented by the system disclosed in my U.S. Pat. No. 4,506,904. This system permits the planter bar to be transported endwise rather than by folding. One advantage of this system is that the tires are steered in the transport position to provide improved tracking of the large planter behind the tractor, even in sharp turns. The planter may be converted from planting configuration to transport configuration and back to planting configuration within minutes and without leaving the tractor seat.

SUMMARY OF THE INVENTION

The present invention is shown in the form of a planter which has a main carrier frame provided with ground support wheels. The carrier frame is not raised relative to the ground support wheels. This reduces the overall load on the lift cylinders and enables the support wheels on the carrier frame to be larger, thereby reducing compaction of the soil. The carrier frame is attached to a tractor by a telescoping hitch tongue. The tongue is actuated by an internal hydraulic cylinder under control of the operator from the tractor. The tongue is retracted for planting use to facilitate turning corners at a lower turn radius, and it is extended for transport to accomodate the planter frame or "lift" frame, as it is called, in an endwise disposition for transport.

The lift frame is mounted to the main carrier frame by means of a lift linkage in the form of a heavy four-bar linkage actuated by a pair of master hydraulic cylinders, each of which is, in turn, provided with one or more slave hydraulic cylinders, depending on the size of the planter.

In the illustrated embodiment, which is in the form of a large, twenty-four row planter, the lift frame has a center section and left and right wing sections. Each of the wing sections is mounted to the center section for independent pivotal motion relative to the center section in the use position so as to accomodate variations in ground contour or to operate a wing section on a terraced terrain. Power locks, again operated from the tractor, secure the wings rigidly to the center section to raise the entire lift frame for road transport.

The center section frame and the wing section frames are made in the form of a box frame having a forward mounting bar and a rear mounting bar with interconnecting braces and struts for rigidity. Conventional pull-type planter row units are mounted to the rear mounting bar of each section of the lift frame at conventional lateral spacings (e.g., 30 in. on center). Row units capable of being pushed rather than pulled such as are disclosed in my co-pending application Ser. No. 736,411, now U.S. Pat. No. 4,648,334 entitled "Agricultural Row Crop Planter With Rear-Driven Row Units" may be mounted in front of the forward mounting bar of each of the sections of the wing frame mid-way between adjacent units on the rear bars; and large fertilizer hoppers may also be mounted on the forward portions of each section of the lift frame.

In this manner, if it is desired to plant corn, the conventional row units mounted to the rear mounting bars may be used, and fertilizer may be applied at the same time. In this case, the forwardly mounted units are raised and locked in the raised position. If it is desired to plant beans which normally are planted at one-half the row spacing of corn, the forwardly mounted row units are lowered, and in the case of planting beans, fertilizer is normally not used. Thus, once the planter has been set up, without changing the spacing of row units or adding or deleting row units, the same configuration may be used to plant corn with fertilizer or to plant beans.

The lift frame is mounted to the carrier frame by a vertical pivot post and the above-mentioned hydraulically powered lift linkage. The master cylinders power the lift linkage and their associated slave cylinders are mounted to raise the respective wing sections relative to the carrier frame. The master and slave cylinders are sized so that the rate of extension of all of the cylinders is equal; however, the overall extension of the master cylinders is greater than that of the slave cylinders. In this manner, the initial movement of the master cylinders and the entire movement of the slave cylinders is used to raise the lift frame and row units to an intermediate position for turning the planter around at the end of a field (called an "end turn"). An important feature of the invention is that in the intermediate position when it is desired to turn the planter around or otherwise maneuver it, all support tires are laterally aligned. This avoids side skidding on the wing tires.

When it is desired to connect the planter to the transport configuration, the slave cylinders are actuated to the limit of their extension and the master cylinders continue to extend, raising the entire lift frame and wing support wheels to a transport height in which the lowermost portions of the row units and the wing support wheels are elevated high enough to clear the transport wheels.

The pivot assembly on which the lift frame is mounted may be rotated by a hydraulic cylinder, also under control of the operator, through an arc of approximately ninety degrees. When the lift frame is raised by the lift linkage, and the pivot assembly is rotated, the length of the lift frame extends fore-to-aft of the tractor—that is, it is generally parallel to the direction of travel.

In summary, in the use position, the lift frame is lowered and extends transverse of the direction of travel. For transport, the lift frame is made rigid, then elevated by the master/slave lift cylinder arrangement described above which powers the lift linkage to a transport height, and the lift frame is then rotated ninety degrees so that the lift frame extends in the direction of travel. The lift frame is automatically locked in this position or transport, and of course, the hitch tongue is elongated for travel. The lift frame cannot be lowered from the transport height inadvertently. It takes a predetermined sequence of operations on the part of the operator.

The use of forward and rear mounting bars on each of the sections of the lift frame, including the wings, permits planter row units to be put on both the forward mounting bar and the rear mounting bar to obtain very narrow row spacings while, at the same time, permitting the planter to carry a full complement of attachments, including seed, insecticide, herbicide, and fertilizer as well as the interplant rows on all sizes of planter without further adaptation. This is a significant advantage from a standpoint of a manufacturer.

Another important aspect of the present invention, which can only be fully appreciated from a complete understanding of the entire system, is that it provides sufficient weight on the tractor hitch (sometimes called "tongue weight") in all positions of use and transport while, at the same time, providing substantially equal weight distribution on either side of the center line or "pull line" of the tractor both in the use position and in the transport position. A positive tongue weight on the tractor hitch is important for controlling the planter and for safety reasons. Uniform lateral weight distribution in the transport position is equally important from the standpoint of steering and safety.

The present invention achieves a desirable weight distribution by a number of factors. The rear row units on the center section are mounted to an arched rear frame member which extends above the support wheels for the main carrier frame and permits the rear center section row units to be located between the tires on the carrier frame and in a more forward location than otherwise would be possible. Weight distribution is further enhanced by mounting the axis of the vertical pivot post on which the carrier frame is mounted at a location on the center line of the system and forward of the wheel axle for the support wheels on the carrier frame. Further, the wing sections are designed such that the mounting bars for the rear row units are forward of the corresponding mounting bar for the center section. The result is a weight distribution between the carrier frame wheels and the hitch tongue which facilitates control of the planter in all positions of use or transport and under all conditions of weight of the various hoppers or attachments on the planter.

It is considered important that this idealized weight distribution for all positions of use and transport is achieved through a configuration of carrier frame design, lift frame structure and the relationship of the lift frame to the carrier frame without adding ballast to the forward mounting bars of the lift frame. Such ballast is useless dead weight and adds to drawbar pull requirements on the tractor.

Even though the illustrated embodiment is in the form of a planter having forward and rear mounting bars to enable interplant row units to be mounted on the front bar, the desirable weight distribution which permits safe and effective control of the planter under all normal conditions of use or transport could equally well be achieved if the forward units were not used or if the fertilizer hoppers were emptied provided the factors indicated are incorporated into the structure.

Other features and advantages of the present invention will be apparent to persons skilled in the art from the following detailed description of a preferred embodiment accompanied by the attached drawing wherein identical reference numerals will refer to like parts in the various views.

BRIEF DESCRIPTION OF THE DRAWING

FIG. 2 is a foreshortened right side view of the telescoping hitch tongue for the planter partially broken away to see the interior;

FIG. 3 is a right side view of the planter with the tongue foreshortened;

FIG. 4 is a plan view of the planter in the transport position, with the right wing foreshortened and some of the rear row units omitted for clarity;

FIG. 5 is a close-up fragmentary top view of the latching mechanism which secures the lift frame to the tongue in the transport position;

FIG. 6 is a front view of the latch mechanism of FIG. 5, partially in cross-section and partially broken away;

FIG. 7 is a rear view of the carrier frame and center section of the lift frame in the use position and with the row units removed;

FIG. 8 is a view similar to FIG. 7 with the center section of the lift frame in the raised position;

FIGS. 14 and 15 are longitudinal sectional views of the wing lift or slave hydraulic cylinders, in the retracted and extended positions respectively;

FIGS. 16, 17 and 18 are hydraulic circuit schematic diagrams of the master/slave lift systems shown respectively in the lowered position, the intermediate position in which the lift frame is elevated for end turns, and in the fully raised position wherein the lift frame can be rotated to the transport position;

FIGS. 19 and 20 are top views of the mechanism for swinging the lift frame between the planting and transport positions respectively;

DETAILED DESCRIPTION OF THE ILLUSTRATED EMBODIMENT

Figure 1:
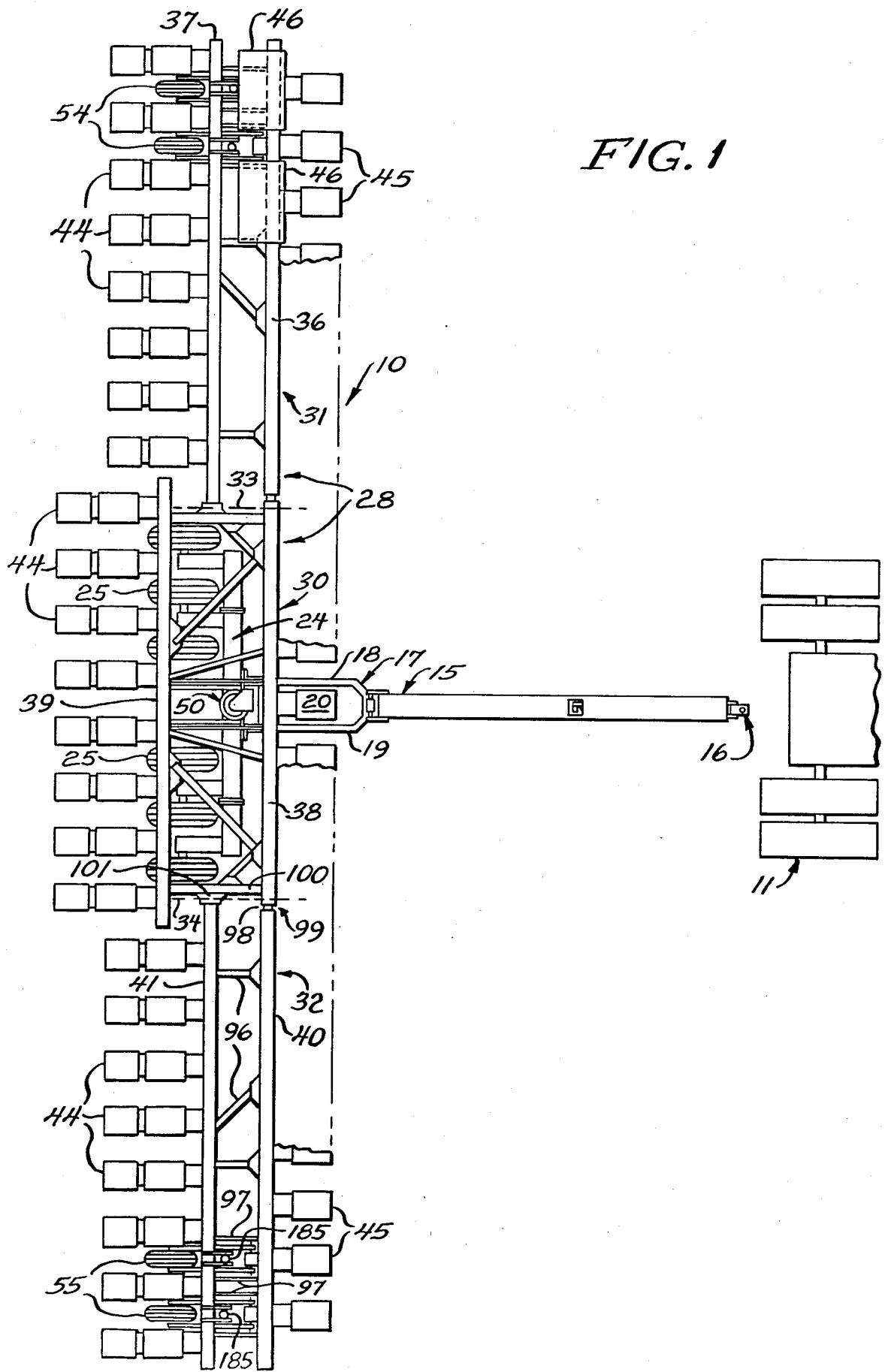
FIG. 1 is a plan view of a planter incorporating the present invention in the use position with some of the forward row units, and some of the accessory equipment deleted or broken away for clarity.
Figure 9:
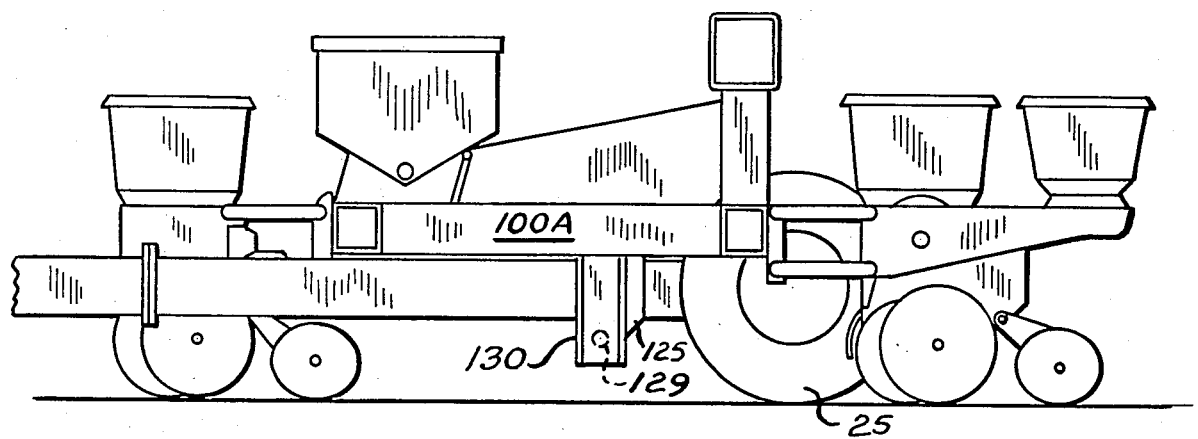
FIGS. 9 and 10 are sectioned left side views of the planter showing movement of the lift frame from the use position to an intermediate raised position and illustrating engagement of the lift frame with a stabilizing cam mechanism in the use position.

Referring first to FIG. 1, reference numeral 10 generally designates a complete planter adapted to be pulled by a large agricultural tractor, the rear portion of which is schematically illustrated at 11. The planter 10 includes a telescoping hitch 15 which includes, at its forward end, a clevis 16 for attaching to the tractor hitch.

The rear of the tongue 15 includes a bifurcated section generally designated 17 and which includes left and right side members 18, 19 which are spaced apart to permit a forward, central row unit 20 to be located on the center line of the apparatus, as will become apparent.

The rear of the bifurcated tongue section 17 is rigidly attached to a main carrier frame 24. In the illustrated embodiment, the carrier frame 24 is provided with six large support wheels 25, and the carrier frame 24 does not elevate relative to its associated support wheels 25.

Supported on the carrier frame 24 is a planter lift frame generally designated 28. The lift frame 28 of the illustrated embodiment includes three sections: A center section generally designated 30 and left and right wing sections designated respectively 31 and 32. The left frame section 31 is attached to the left side of the center frame section 30 for vertical pivotal movement about a horizontal axis designated 33. Similarly, the right lift frame section 32 is mounted to the right side of the center frame section 30 for pivotal motion about a horizontal axis 34.

Left and right wing lock mechanisms (one of which is generally designated 35 and seen in FIGS. 21 and 22) are included for locking the left frame section 31 (sometimes referred to as a "wing" or "wing frame") and the right frame section 32 to the center frame section 30 to preclude downward motion about the axes 33, 34 when it is desired to raise the entire lift frame (which includes both wings) for transport, although the wing locks permit the wings to move upwardly to clear an obstruction should they strike one. When the wing lock mechanism (which are actuated hydraulically from the operator's position on the tractor) are not actuated, the wing sections are free to move vertically up or down independent of one another and independent of the center frame to accomodate themselves to variations in ground contour or for operating over terraces.

Each of the lift frame sections has a forward mounting bar and a rear mounting bar which are connected together by transverse frame members to form a rigid section frame. Thus, the left frame section 31 includes a forward mounting bar 36 and a rear mounting bar 37. The forward and rear mounting bars for the center frame section 30 are designated 38 and 39 respectively; and the corresponding forward and rear mounting bars for the right frame section 32 are designated 40 and 41 respectively.

A set of 24 conventional planter row units designated 44 are mounted to the rear mounting bars of the frame sections. That is, eight row units each are mounted to the rear mounting bars 37, 39 and 41. Similarly, eight pusher-type row units designated 45 are mounted to each of the forward mounting bars 36 and 40 of the wings, and seven pusher row units 45, including the center row unit 20 are mounted to the forward mounting bar 38 of the central section 30 of the lift frame. Some of the forward units have been removed for clarity.

As best seen in the upper portion of FIG. 1, a plurality of storage hoppers 46 for dry fertilizer are also mounted on the forward mounting bars 36, 38 and 40 (although only the two on the left side are seen in FIG. 1 for clarity). Fertilizer attachments (including openers and distribution conduits) are provided for distributing particulate fertilizer stored in the hoppers 46 when it is desired to plant corn. These fertilizer attachments, generally designated 47 in FIG. 3, are conventional, and there is one associated with each of the rear row units 44.

Although the invention is illustrated in the form of a row crop planter with individual row units, many aspects of the invention are equally well suited to other large implements, as persons skilled in the art will readily appreciate. For example, the row units could be replaced by tillage tools, or cultivator blades or points, or spraying attachments (all referred to as "working units").

Figure 11:
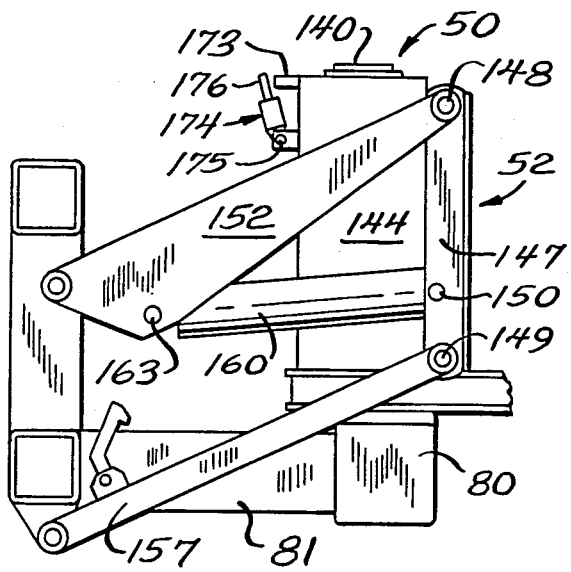
FIG. 11 is a side view of the lift linkage in the use position.
Figure 12:
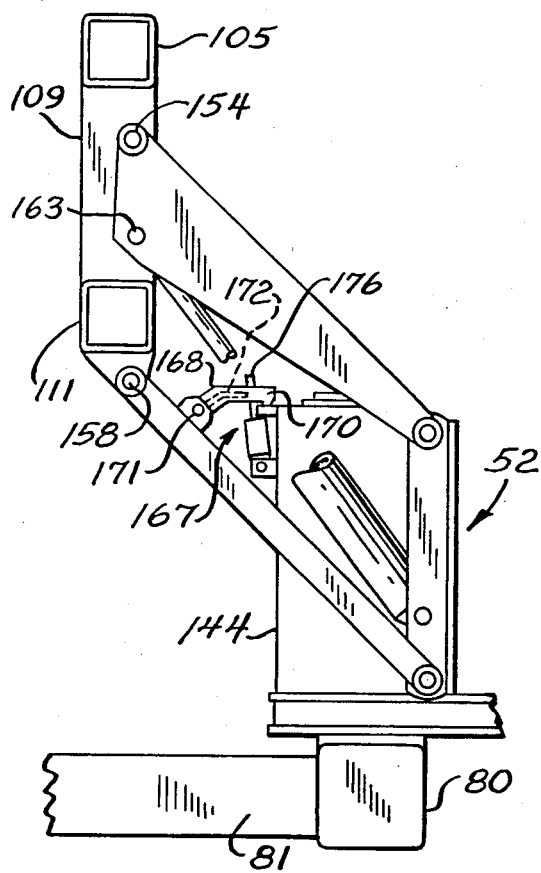
FIGS. 12, 12A and 12B are side views similar to FIG. 11 with the lift frame in the raised position and illustrating the sequence of operations required to lower it.
Figure 13:
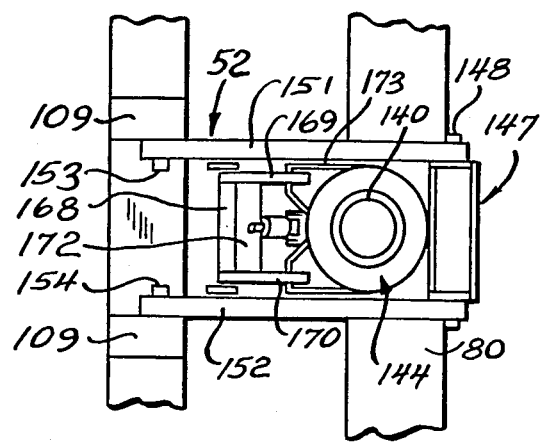
FIG. 13 is a fragmentary top view of the main lift mechanism shown in FIG. 12.

The lift frame 28 is connected to the carrier frame 24 by means of a pivot post assembly generally designated 50 in FIG. 1 and an hydraulically powered lift linkage mechanism generally designated 52 and seen in detail in FIGS. 11–13. It will be observed from FIG. 1 that the vertical axis of the pivot post assembly 50 is located forward of the axes of rotation of the carrier frame support wheels 25, and on the centerline of the implement. When the lift frame is raised for transport, the entire weight of the lift frame, row units, fertilizer and accessories is borne by the pivot post assembly and transmitted to the carrier frame 24 at a location forward of the main support wheels 25, as will be further described within.

The outboard end of the left lift frame section 31 is supported by wing support wheels 54 in the planting position and the intermediate raised position for end turns. The outboard end of the right lift frame section 32 is similarly supported by wing support wheels 55. Although two wing support wheels are seen on each wing end, one, two or three may be used, depending on the size of the planter.

Turning now to FIG. 3, the conventional rear row units 44 are seen to be mounted to the rear mounting bar 39 of the center lift frame section by means of a conventional four-bar linkage generally designated 58 which permits each of the individual row units to follow ground contour independently of the others. The four-bar linkage 58 may include a down-pressure spring for increasing the downward force on the row unit to promote soil penetration, and a stop member 59 is also provided to limit the downward motion of the four-bar linkage 58. This permits the row units to be raised when the lift frame section to which they are mounted is raised above a certain height.

Similarly, the push type row units 45 mounted to the forward mounting bars are connected by means of four-bar linkages generally designated 60 to the associated forward mounting bar 38. The four-bar linkages 60 also include down-pressure springs and a stop member 61 so that the forward row units are also raised when the lift frame section to which they are attached is raised.

A brief description of the function and operation of the structure which has already been described will now be given so that the nature and operation of the overall system can better be appreciated.

The planter system as seen in FIG. 1 is set in the planting or use configuration. The tongue 15 is retracted to minimize the distance between the rear wheels of the tractor and the planter to facilitate turns at the end of a swath traversed by the planter. In the use position as well as when making end turns, the wing locks 35 are unlocked, permitting the left and right wing sections to pivot freely relative to the center frame section 30 to follow uneven ground contours. The entire lift frame 28, of course, is lowered, the wing support wheels 54, 55 are actuated by their associated hydraulic cylinders to positions between adjacent row units and immediately adjacent those units in the use position. The lower limit of the center frame section 30 is determined by the lower limit of the lift linkage assembly 52, to be described in more detail below. Thus, each of the individual row units 44, 45 is free to move up and down as required by the ground contour for accurate planting depth.

The lateral spacing of the rear row units 44 is set at the desired row spacing for corn (typically, 30 in. on center between adjacent row units). When corn is planted, the forward row units 45 may be locked in a raised position, and fertilizer from the storage hoppers 46 is distributed adjacent each of the seed furrows when planting corn. The forward row units 45 need not be removed from the planter even though corn is being planted.

When it is desired to plant beans, fertilizer normally is not deposited, so the fertilizer attachments 47 are closed off and raised. The forward row units 45 are mounted such that their center lines fall midway between the center lines of adjacent rear row units 44.

Thus, the forward row units 45 are sometimes referred to as "interplant" units. If both the forward and rear row units are employed, the resulting rows will be planted on a 15 in. spacing.

When it is desired to raise the row units out of ground engagement for an end turn, the lift linkage assembly 52 is actuated to an intermediate height, and the left and right frame sections 31, 32 are also elevated relative to their associated support wheels 54, 55 so that all of the row units are disengaged. Further, the wing support wheels are brought forward from the position adjacent the row units as shown in solid line to that shown in phantom in FIG. 24. In the forward position (i.e., when the wings are raised to the intermediate position for end turns) the wing support wheels are laterally aligned with the support wheels 25 of the carrier frame. That is, all support wheels rotate about their respective axes which all lie substantially in the same vertical plane. This permits end turns without skidding the outboard tires sideways. The lift linkage assembly and its associated actuating mechanism will be further described within, and it will then be understood that the lift linkage assembly 52 may be raised to a height above this intermediate position to a transport height.

When it is desired to put the planter in a transport configuration, the wing locks 35 are actuated to cause the wing sections to be secured to the center frame section so they cannot lower, and the lift linkage assembly 52 is actuated to its full height. This elevates the center frame section 30 and both wing frame sections 31, 32 as well as their associated support wheels 54, 55 above the ground so that the row units and wing support wheels are elevated above the carrier frame and tongue. Next, the lift frame is rotated counterclockwise about pivot post assembly 50 (when viewed from the top) approximately a quarter turn to the position shown in FIG. 4 wherein the lift frame is elongated parallel to the direction of travel of the tractor, thereby providing a minimum width for road travel. The rotation of the lift frame about the pivot post assembly 50 is effected by an hydraulically powered swing linkage assembly seen in FIGS. 19 and 20 and generally designated 65. As seen in FIG. 4, the telescoping tongue 15 is extended for the transport position, and the right end of the right frame section 32 is automatically locked in the transport position by a transport latch assembly 67 mounted to the tongue 15.

Turning now to FIGS. 2, 3 and 4, the telescoping hitch tongue 15 includes an inner tubular member 70 which is rigidly attached to the bifurcated tongue section 17, and houses an hydraulic cylinder 71, the base of which is mounted to tube 70 near its rear end.

The forward end of the tube 70 is open (see FIG. 2) and it is provided at its lower portion with a bearing roller 73 which supports the forward end by engagement with the inner surface of the lower side of an outer tubular tongue portion 75. The tubular members 70, 75 have generally square cross sections; and the outer member 75 is telescopically received on the inner member 72 when the tongue is retracted as seen in FIG. 2. The upper rear end of the outer tube 75 is provided with a bearing roller 76 mounted on a shaft 76A which rides on the outer surface of the upper wall of the inner tube 70 during telescoping action. The forward or rod end of the hydraulic cylinder 71 is pivotally connected at 77 to the forward end of the outer tube 75 which is provided with an end plate 78 adapted to receive the clevis 16 for connection to the tractor hitch.

A tongue lock 74 is used to latch the telescoping members 70 and 75 in the retracted position. The tongue lock 74 includes a latch member 74A pivotally mounted to engage and hold the shaft 76A. The latch member may be raised by an hydraulic cylinder 74B from the operator's position on the tractor.

The left and right frame members 18, 19 of the bifurcated frame section 17 are flanged as seen at 79 for member 19 in FIG. 2 for mounting to a transverse frame member 80 of the carrier frame 24 (see FIG. 4). The carrier frame wheels 25 are attached to the transverse frame member 80 by means of rearwardly extending strut frames 81 and conventional wheel spindles and hubs.

Turning now to FIGS. 5 and 6, there is shown in more detail the transport latch assembly 67. A hook-shaped element 82 having upper and lower guide surfaces 82A, 82B and a curved portion 82C is welded beneath the outboard end of the rear mounting bar 41 of the right wing frame 32, as seen in FIG. 4. A piece of rod stock 84 is welded to an upright support member 83 as seen in FIG. 5 to form a latching element which is received in and held by the curved holding portion 82C of the hook 82. The support member 83 is mounted to a base 85 which includes a bottom 86 (FIG. 5) which has vertical mounting plates 87. Plates 87 are bolted to mounting brackets 88 which are welded to the top of the outer tubular member 75 of the hitch tongue. The height of the rod member 84 may be adjusted by adjusting support member 83 relative to the base 85 using bolts 89. For this purpose, both members may be provided with sets of equally spaced apertures. Similarly, mounting brackets 88 are provided with sets of equally spaced apertures so that the rod 84 may be adjusted along the length of the hitch tongue.

An hinge plate 89 is pivotally mounted at 90 to a support bracket generally designated 91 which is welded to mounting bar 41. Hinge plate 89 has a hole 92 formed in it for receiving the rod 84. The hinge plate 89 also has a guide surface 93 to assist in placing it over rod 84 when the lift frame is rotated to the transport position. The hinge plate 89 is biased by means of a spring 94 to the latching position seen in solid line in FIG. 5. The tongue lock is unlocked so that the lift frame can be counter-rotated to its transverse position by actuating the tongue cylinder 71 to retract the tongue. This will move rod 84 rearward (upward in FIG. 5) and thereby withdraw it from the hinge plate 89 and free the lift frame.

It will be recalled that each of the frame sections, including the center frame section 30 and left and right wing frame sections 31, 32, has a forward mounting bar and a rear mounting bar which are formed into rigid frame sections. The forward mounting bars 36, 38 and 40 are aligned with their axes elongated and extending in a vertical plane transverse of the direction of travel of the tractor 11 in the use position. However, the rear mounting bars 37, 41 of the wing frames are mounted forwardly of the rear mounting bar 39 of the center frame section. This has two advantages—first it shifts forwardly the weight of the rear row units 44 on the wing frame sections, adding stability to the lift frame and carrier frame. Secondly, it permits the wing support wheels 55 to be moved forwardly so that they are laterally aligned with the support wheels 25 of the carrier frame in the intermediate raised position for end turns; but they are positioned adjacent the row units when the lift frame is lowered to the planting position. It will also be observed that moving the wing wheels between these two positions is made possible because they are located in the spaces between row units.

The right wing frame 32 is made rigid by struts 96 welded between the forward and rear frame bars 40, 41, as well as by plates 97 welded between the mounting bars at the outboard ends thereof. The forward mounting bar 32 has a reduced extension 98 which is journalled on a pin secured at 99 in the forward mounting bar 38 of the center frame section 30. The inboard end of the rear mounting bar 41 is secured to a transverse frame member 100 by pivot connection 101. Thus, the left wing frame is similarly constructed and mounted to the center frame section.

Turning now to FIGS. 7 and 8, the rear mounting bar 39 of the center section is arched and includes an upper horizontal central section 105 and downwardly inclined left and right side portions 106, 107. Extending downwardly from the arched rear mounting bar 39 are eight vertical strut members 109, each of which is provided with a horizontal mounting section. The second, third, sixth and seventh mounting sections are designated 110 and all are similar. The horizontal mounting section for the two center vertical struts 109 are made integral and the mounting member is designated 111. The two outboard mounting sections are designated 112 and they are welded to the bases of the inclined side frame sections 106, 107 respectively and braced by transverse members, one of which is the member 100 discussed above. The arched rear mounting bar is made rigid by an elongated brace member 114 which is welded to the inclined portions 106, 107 and to all of the struts 109 to further stabilize the mountings for the rear row units.

As best seen in FIG. 1, the arched mounting bar 39 extends above the support wheels 25 for the carrier frame 24. This enables the rear row units on the center section to be placed between the support wheels 25 and further forward than would otherwise be possible if the rear mounting bar 39 were located at the same elevation as the individual mounting sections 110, 111 and 112, as can be seen by comparing FIGS. 1 and 7. The forward placement of the rear row units on the center section is one factor in achieving the desired weight distribution mentioned above.

FIG. 8 shows the center section of the lift frame in the elevated position and more clearly illustrates the arrangement and location of the arched mounting bar 39, the vertical struts 109 and individual mounting sections. It also illustrates that when the lift frame is elevated, the carrier frame 24 remains in the same position relative to the main ground support wheels 25.

Referring now to FIGS. 7-10, when the lift frame and row units are in the planting position, it is desirable to stabilize the lift frame and prevent horizontal movement about the pivot post assembly 50. If the planter frame were free to rotate about the pivot post assembly 50 in the use position, there would be a tendency for it to oscillate or "duck walk" about the center pivot attachment to the carrier frame. To prevent this, first and second stabilizer means designated respectively 120 and 121 in FIG. 8 are provided on the left and right sides respectively of the carrier frame 24—that is, on either side of the longitudinal center line of the planter in use position since the axis of the main pivot post assembly 50 lies on the center line of the machine. The left and right stabilizing means 120, 121 are similar in structure and function, and only the left stabilizer means 120 will be described in further detail.

Turning then to FIG. 4, it will be recalled that the carrier frame 24 includes a large transverse tubular frame member 80 to which all of the support wheels 25 are mounted by means of rearwardly extending wheel support struts 81 welded to the rear of the transverse frame member 80 and carrying the wheel spindles.

Figure 10:
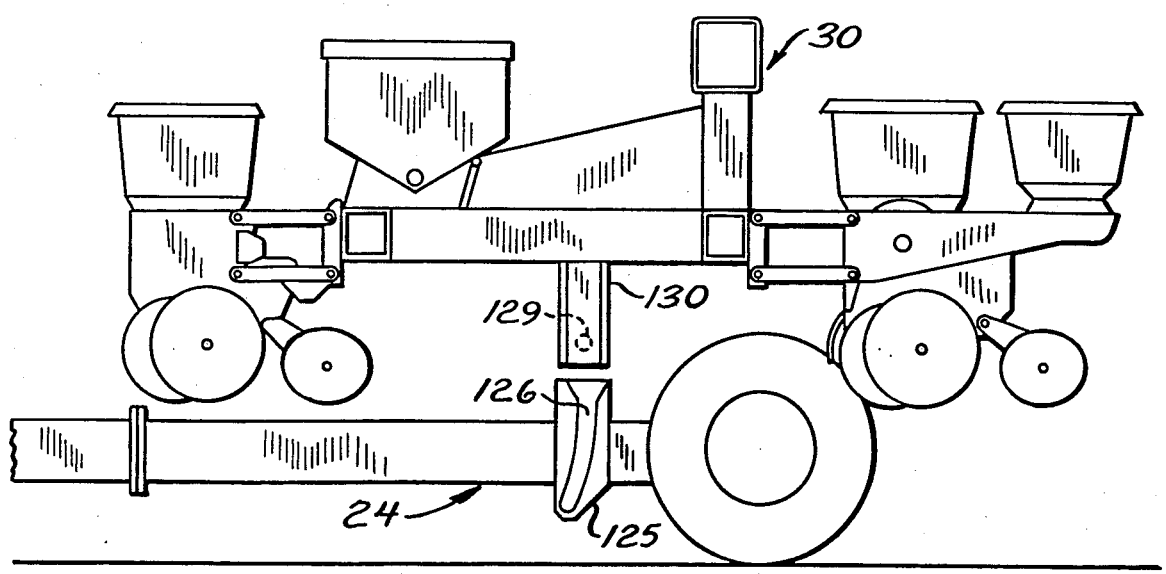

As seen in FIG. 10, an upwardly extending plate 125 is also secured to the left side of tubular frame member 80 of the carrier frame 24, and it defines an upwardly extending cam track or groove 126. A similar plate defining a groove and designated 127 is mounted to the right side of frame member 128. A cam follower 129 is mounted to a transverse brace 100A of the frame of the center section. A mounting bar 130 secures the cam follower 129 to the center frame section.

As seen in FIG. 10, the center frame section 30 is raised above the intermediate position. It will be seen that the cam track extends downwardly and is curved slightly so as to bring the center frame section 30 slightly forwardly into fixed transverse orientation relative to the direction of travel to stabilize the lift frame. The use of stabilizers on either side of the center pivot eliminates any tendency of the center frame section to duck walk in the use position.

Turning now to FIGS. 11-13, the pivot post assembly 50 and hydraulically powered lift linkage assembly 52 will be described in detail. The pivot post assembly 50 includes a rigid center post 140 which is rigidly secured to the transverse tubular frame member 80 of the carrier frame 24. The post 140 defines a vertical axis about which the lift frame rotates, but the post itself does not rotate. The post 140 is actually a cylinder with internal bracing which is rigidly connected to tubular frame member 80 of the carrier frame 24.

A sleeve or bell housing 144 is rotatably mounted on the post 140 by means of upper and lower tapered roller bearings to permit carrying a vertical load as well as to resist side thrust. The bell housing 144 is provided with a forward bracket 147 in which three transverse pivot pins 148, 149 and 150 (see FIG. 11) are mounted.

Referring now to FIG. 13, the lift linkage 52 includes left and right upper links 151, 152 which have their forward ends journalled to the upper pivot pin 148 and their rear ends journalled on a pivot pins 153, 154 mounted respectively to the two center struts 109 of the arched rear mounting bar of the center section frame.

The lift linkage 52 also includes a pair of lower links, one of which is designated 157, which have their forward ends journalled on the lower pivot pin 149 mounted in the bracket 147 and their rear ends journalled on a pivot pin 158 which is mounted beneath the previously described horizontal mounting section 111 of the arched rear mounting bar.

A pair of hydraulic cylinders, the right side cylinder being seen and designated 160, have their butt ends pivotally mounted on pin 150 and their rod ends journalled on pin 163 which is mounted in upper link 152. The upper links 151, 152 are in the form of inverted channels which partially encompass their associated cylinders in the lowered position (FIG. 11), so they cannot be seen from above.

When the cylinders 160 are retracted, the lift linkage 52 is rotated counterclockwise to the lowered position (when viewed from the right) of FIG. 11. When the cylinders are extended, the linkage is rotated clockwise to raise the lift frame as seen in FIG. 12.

A lock for locking the lift frame in the fully raised position when the cylinders 160 are fully extended is generally designated 167. The lift frame lock includes a latch member 168 having first and second side hooks 169, 170 (see FIG. 13) and which is journalled on pin 171 mounted to the lower links 157 of the lift linkage. A center plate 172 is provided as an integral member of the latch member 168.

A bracket 173 is welded to the upper portion of the bell housing 144 for receiving the hooks 169, 170 on either side of a small hydraulic cylinder 174 which has its butt end pivotally mounted to the bell housing 175, and includes a rod 176, as seen in FIG. 11.

When the lift linkage 52 is lowered to the position shown in FIG. 11, the hydraulic cylinder 174 is in the position shown there, the butt end resting on the bracket which supports the pivot pin 175, and the rod 176 extending upwardly and slightly to the rear. The rod 176 is seen in the retracted position in FIG. 11 as extending outside the cylinder a considerable distance. The reason for this is that when the linkage 52 is raised by extending the main hydraulic cylinders 160 to the position shown in FIG. 12, the leading edge of the plate 172 of the latch member 168 strikes the rod 176 of the cylinder 174 and moves it forward slightly. As seen in FIG. 12, the cylinder 174 cannot be retracted because it is connected in circuit with the main hydraulic cylinders and will extend when they are extended.

Figure 12A:
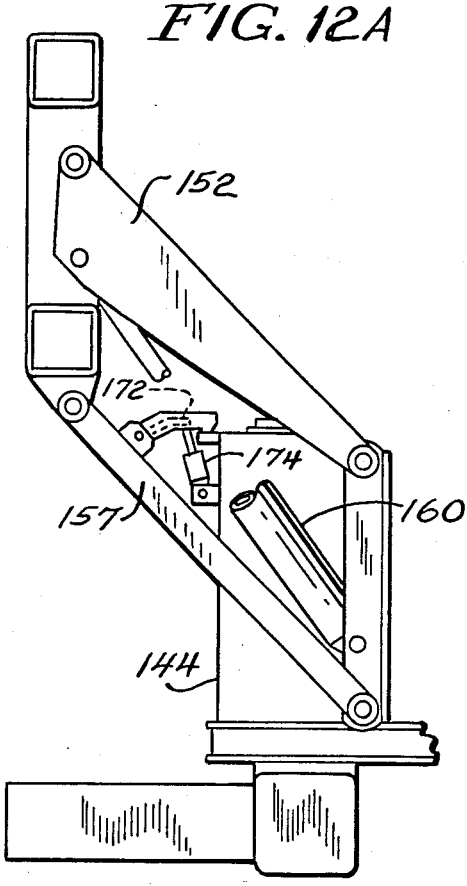
Figure 12B:
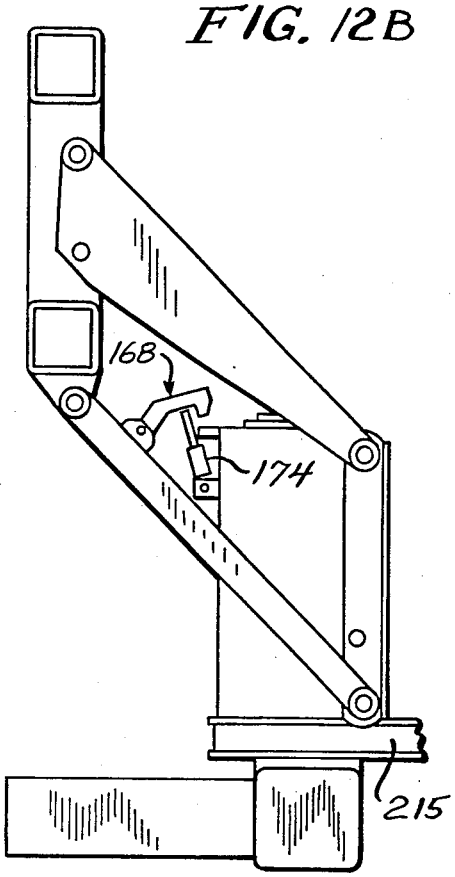

As seen in FIG. 12, the hydraulic cylinder 174 is extended, and it cannot be retracted until the main hydraulic cylinders 160 are retracted. When these main cylinders 160 are retracted, as seen in FIG. 12A, then the unlock hydraulic cylinder 174 is retracted so that the rod 176 extends below the transverse plate 172 on the latch member 168. This enables the unlock hydraulic cylinder 174 to rotate slightly counterclockwise as seen in FIG. 12A so that its rod 176 is beneath the transverse plate 172. This permits the operator to extend the hydraulic cylinders 160 once more, and this will cause the unlock hydraulic cylinder 174 to extend once more as seen in FIG. 12B, thereby rotating the latch member 160 out of engagement with the latch bracket 173. This will permit the operator then to lower the lift frame completely if he desires.

The purpose of the latch mechanism 167 is to lock the lift frame in the raised position so that the lift frame or working units may be adjusted or repaired from beneath the lift frame without fear of its falling. This is true even if the pressure is lost in the hydraulic system. The purpose of the arrangement of the unlocked cylinder 74 and the required sequence just described is to prevent inadvertent lowering of the lift frame, and it requires the operator first to reverse the main lift cylinders 160 by forcing fluid into the rod end. The main cylinders do not retract, however, because the lift frame is being held in the raised position by the latch 167. However, the unlock cylinder 174 retracts and rotates to the position of FIG. 12A where it is then capable of unlocking the latch member 168. The operator must then force fluid into the butt ends of hydraulic cylinders 160, and this will also force fuild into the butt end of the unlock cylinder 174, causing it to extend as seen in FIG. 12B, and raising the latch member 168. The operator may then lower the lift frame completely if he desires.

Each of the main lift cylinders 160 are master cylinders. The slave cylinders associated with master cylinders 160 are designated 185; and they are located to raise the left and right wing frames 31, 32 relative to the wing support tires 54. The master cylinder on the right is seen at 160 in FIGS. 11 and 12; and it is connected in circuit with the lift cylinders for the right wing which are designated 185 in FIGS. 1, 16–18 and 24. The slave cylinders actuated by the left side master cylinder 160A (FIG. 16) are designated 186. The slave or wing lift cylinders will raise the outboard ends of the wing frame sections relative to the wing support tires 55 when extended. As will also be described presently, the extension of the master cylinders 160, 160A is approximately twice the extension limit of the slave cylinders so that when the slave cylinders are fully extended (thereby raising the wings and row units above the ground for an end turn), the master cylinders are extended to an intermediate position but are not fully extended.

As the master cylinders raise the center frame section, the slave cylinders raise the outboard ends of the wing frames at the same rate. In other words, the slave cylinders are sized relative to their associated master cylinders such that the oil pumped from the rod end of one of the master cylinders as it extends is fed to the butt end of both associated slave cylinders, and causes them to extend in unison at the same rate as the master cylinder. The force of the master cylinders on the links 151, 152 and the action of the lift linkage 52 causes the center frame section to raise in unison with the wing sections. The slave cylinders associated with a given master cylinder are connected in parallel with one another.

Figure 24:
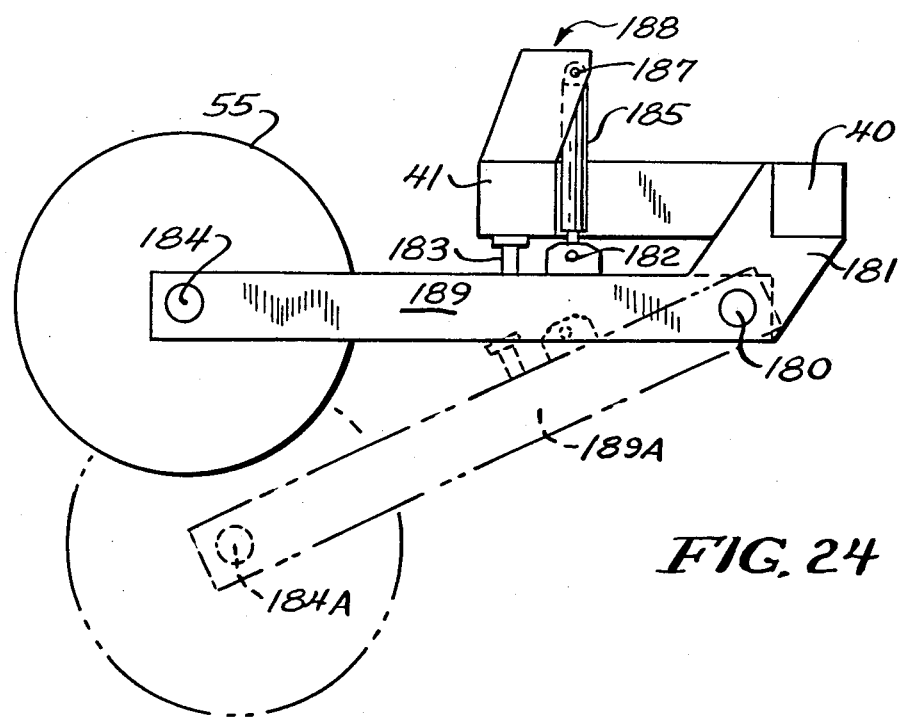
FIG. 24 is a side view of a wing support wheel and its associated lift cylinder.

Referring now to FIG. 24, the slave or wing lift cylinder 185 associated with master cylinder 160 has its butt end connected at 187 to a pin which is received in a cylinder housing generally designated 188 which is mounted to the rear mounting bar 41 of the right frame section. The wing lift wheel 55 is mounted on an arm 189 which is pivotally mounted at its forward end to a pin 180 mounted by means of a bracket 181 to the forward mounting bar 40 of the right wing frame. The rod end of the lift cylinder 185 is pivotally connected at 182 to a bracket mounted on the top of the arm 189; and an adjustable stop 183 is mounted to the top of the wheel arm 189 to limit the downward movement of the wing frame relative to the wheel 55. This lower position of the wing frame defines the planting position for the row units. When the hydraulic cylinder 185 is extended, the wing frame section is raised by rotating the wheel arm 189 counterclockwise about the pivot 180 to the position shown in phantom and designated 189A in FIG. 24. It will also be observed that in the raised position, the horizontal axis of rotation of the support wheel 55 (which is, as noted, located between adjacent row units) has moved forward from the position shown at 184 (in which the wheel is adjacent the row units) to that shown at 184A. When the wing support wheel 55 is in the raised or intermediate position, the axis of the wheel (as indicated by location 184A) is moved forward to a transverse vertical plane which is substantially the same plane as contains the axes of all wing lift wheels and the wheels supporting the carrier frame and designated 25. When the lift frame is in the intermediate position and all of the support wheels are laterally aligned, end turns can be made without causing the outermost wing support wheels to skid sideways during a sharp turn.

The slave cylinders (i.e., wing lift cylinders) are constructed as seen in FIGS. 14 and 15 as including a cylinder casing 190 and a rod 191 received in the cylinder. A clevis mounting for the butt end is designated generally 192. A similar clevis mounting for the rod is designated 193. A piston 194 is conventionally mounted to the rod 191 and is seen in the retracted position in FIG. 14 and the extended position in FIG. 15. In the extended position, a collar 195 limits extension of the rod; and a reduced threaded portion of the rod itself on which the piston 194 is mounted limits retraction by engaging the butt end of the cylinder casing, as is well known.

The slave cylinders are double-acting cylinders having a first inlet port, called the butt end inlet designated 196 and a rod end inlet designated 197. When pressurized hydraulic fluid is forced in the inlet port 196, the cylinder extends; and when the high pressure side of the source is connected to the inlet port 197, the cylinder retracts. The cylinder is provided with an oil bypass in both the extended and retracted positions. The oil bypass for the retracted position is generally designated by reference numeral 200 and includes apertures 201 and 202 which extend through the casing on either side of the piston 194 when the cylinder is in the fully retracted position as seen in FIG. 14, thereby permitting oil to flow into the rod end inlet port 197, through the apertures 201, 202 and out the butt end port 196. The bypass for the rod end of the cylinder is generally designated 204 and includes two apertures 205, 206 which extend through the casing and are located on either side of the piston 194 when the cylinder is in the fully extended position as seen in FIG. 15, thereby permitting hydraulic fluid to flow under pressure from the butt inlet port 196, through apertures 206, 205 and out through the rod end port 197.

As already indicated, the master and slave lift cylinders extend at the same rate until the slave cylinders are fully extended. If the wings are locked rigidly to the center section (as will be described), the entire lift frame may be elevated by continuing to actuate the master cylinders after the slave cylinders are fully extended. This will elevate the row units to a position above the carrier frame. Further extension of the master cylinders raises the lift frame above this intermediate position so that even the wing support wheels 54, 55 are raised off the ground; and the entire weight of the lift frame, row units, fertilizer hopper and wing support wheels is carried by the master cylinders and the lift linkage. In order to better understand this, reference is now made to the hydraulic circuit diagrams of FIGS. 16–18.

The hydraulic pump which is normally a part of a tractor and used to power hydraulic cylinders on implements has a pressure line and a sump or return line connected to the hydraulic fluid reservoir of the tractor. These lines are fed through solenoids actuated by the tractor operator; and the lines may be reversed to reverse the action of the double-acting cylinders. The solenoids controlled by the operator are connected to two lines designated respectively 209 and 210 in FIG. 16. The line 210 communicates with the butt ends of both master cylinders 160 and 160A. The rod end of master cylinder 160 is in fluid communication via line 211 with the butt ends of both right side wing slave cylinders 185; and the rod ends of those cylinders as well as the rod ends of slave cylinders 186 are all in fluid communication with the line 209. The rod end of master cylinder 160A is in fluid communication via line 212 with the butt ends of left side slave cylinders 186. The rod end of the lift unlock cylinder 174 is connected to line 209, and its butt end is connected to line 210.

When the operator desires to raise the lift frame, he actuates a lever which communicates line 210 with the pressure side of the hydraulic pump and another solenoid is actuated to communicate line 209 with the sump or return. When pressurized fluid is fed to line 210, it will cause master cylinders 160, 160A to extend. Oil pumped from the rod ends of the master cylinders will be fed to the butt ends of the associated slave cylinders; and all cylinders will extend in unison and at the same rate, thereby raising the entire lift frame as a unit. When the slave cylinders have reached their maximum extension as diagrammatically illustrated in FIG. 17, the master cylinders 160, 160A will have extended approximately half way, and unlock cylinder 174 will be extended.

If the operator desires to place the lift frame in transport configuration, he will first have locked the wings as will be described presently. He will then raise the lift frame to the intermediate position with the cylinders as shown in FIG. 17. But he will continue to actuate the same lever to cause the additional fluid to flow into line 210, causing master cylinders to continue to extend. Hydraulic fluid will bypass the pistons on all slave cylinders and return to the reservoir via line 209. Returning to FIG. 12 for a moment, the lift frame will continue thereafter to elevate under action of the extension of the master cylinders.

When the slave cylinders are fully extended, as already indicated, oil continues to flow via rod end bypass 204 until the master cylinders are fully extended as seen in FIG. 18, at which time the lift frame is fully raised to the transport position (but not yet rotated, as will be disclosed presently); and the row units and wing support wheels are raised to a height above the ground and sufficient to clear the carrier frame and the carrier support wheels so that the lift frame may be rotated. When it is desired to lower the lift frame from the fully raised position (i.e., transport height), pressurized fluid is communicated to the line 209, and the line 210 is connected to the sump. In this mode, the unlock cylinder 174 retracts immediately due to its small size. The lift frame will not lower because the latch 168 (FIGS. 11-13) is still engaged. The operator must intentionally reverse the flow once more after the unlock cylinder has rotated to the position shown in FIG. 12A to raise the latch 168 as seen in FIG. 12B. The operator may then reverse the flow once more, and the frame will lower.

During lowering, the weight of the wing lift tires maintains the slave cylinders in their extended positions, and during the initial movement of the master cylinders, hydraulic fluid flows through the rod end bypass 204 (see FIG. 14) until the wing wheels contact the ground. All cylinders then retract together to lower the lift frame. When all cylinders are fully retracted, the butt end bypasses on the slave cylinders also serve as a means for purging air from the lines, and all air will be purged as long as the operator continues to engage the actuating lever in the "down" position until the master cylinders are fully retracted and for a short time thereafter to clear the lines of air.

Turning now to FIGS. 19 and 20, the swing linkage assembly 65 for rotating the lift frame will now be described. As seen in FIG. 19, a plate 215 is provided at the bottom of the bell housing 144 (see also FIG. 11) and rests on the lower bearing for the rotatable portion of the pivot post assembly 50. The swing linkage is mounted above the main transverse frame member 80 of the carrier frame, as already described. A crank arm 217 is welded to the circular plate 215. A connecting link 218 is pivotally connected at 219 to the crank arm 217, and it is pivotally connected at 220 to a link 221 which, in turn, is pivotally mounted at 222 to the transverse frame member 80. An hydraulic cylinder generally designated 225 has its butt end pivotally connected at 226 to the frame member 80 for horizontal movement about a vertical axis. The rod end of the cylinder 225 is pivotally connected at 227 to the link 221.

A first stop member 228 is welded to the top of the transverse frame member 80 to limit the clockwise rotation of the crank arm 217; and a second stop member 229 is welded to the rear wall of the frame member 80 and extends above it to limit the counterclockwise rotation of the link 221 to the position shown in FIG. 19.

In operation, when the swing cylinder 225 is extended, the link 221 is rotated counterclockwise until it engages the stop 229. At the same time, the link 218 causes the crank arm 217 to be rotated clockwise until it engages the stop 228. In this position, the pivot post disposes the planter frame so that it extends transverse of the direction of travel of the tractor. The frame is locked in that position even if hydraulic power is lost because the link 218 (more precisely, a line 218A passing through the centers of the pivots 219, 220) is "over center" relative to the axis of pivot 222; and the link 221 cannot rotate any further counterclockwise due to the presence of stop 229.

When the hydraulic cylinder 225 is retracted, the link 221 is rotated clockwise to the position shown in FIG. 20, thereby causing the crank arm 217 to be rotated approximately ninety degrees counterclockwise to the position shown in FIG. 20 wherein the lift frame will rotate relative to the original transverse or use position to the transport position in which the planter frame extends approximately parallel to the direction of travel.

Figure 21:
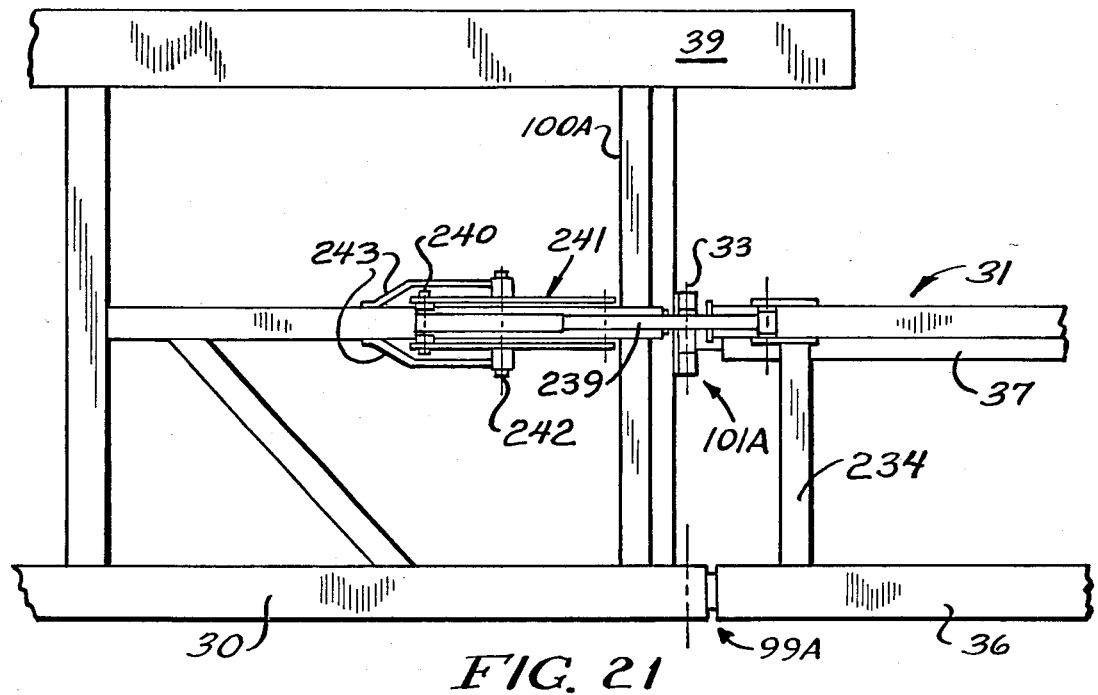
FIGS. 21 and 22 are fragmentary rear views of the mechanism for locking the wing frames for transport.

Another advantage of the swing mechanism seen in FIGS. 20 and 21 is that as the mechanism rotates the lift frame from the transport position (FIG. 20) to the use position (FIG. 19), the mechanism decelerates the rotation of the lift frame as it approaches the transverse or use position. Assuming a constant rate of speed for the rod end of the cylinder 285, when the link 221 is in the position of FIG. 20, the pivot 220 is in closer alignment with the movement of the piston rod, and the pivot 220 actually crosses an extension of the center line of the pivot at some point early in the counterclockwise rotation of link 221. Thus, in the initial stage of converting to the transport configuration, the link 218 which rotates the crank arm 217 moves at about the same speed as the rod of the piston. However, as the link 221 rotates toward the position of FIG. 19, the center of pivot 220 crosses a line connecting pivots 219 and 222, thus eliminating any further clockwise rotation of crank arm 217. Further, as will be appreciated, as the link 220 rotates toward the limit position of FIG. 19, the amount by which the link 218 moves to the right actually reduces for the same increment of change in the length of the cylinder. This decelerates the heavy lift frame and its contents as the lift frame approaches the use position.

Figure 22:
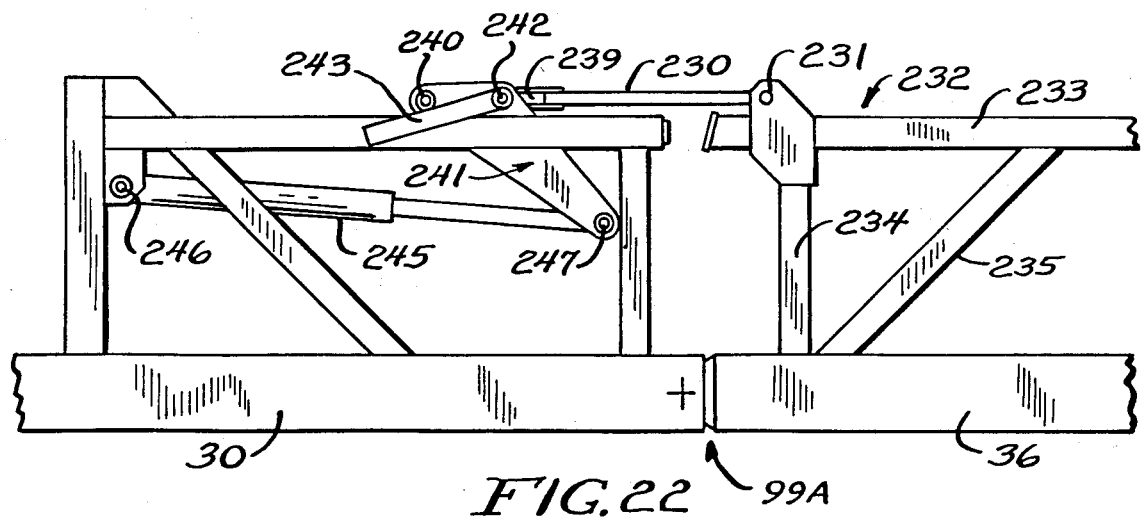

Turning now to FIGS. 21 and 22, the wing lock mechanism for the left side wing section 31 will now be described. The rear mounting bar 37 for the left wing section is shown in fragmentary form. It is pivotally mounted to the center section at 99A and 101A.

Above the rear mounting bar 37 there is a "lost motion" arm 230 which is pivotally mounted at 231 to a superstructure generally designated 232 above the wing section. The superstructure includes a horizontal frame member 233, inclined braces 234, 235 and a vertical member (hidden from view in FIG. 21) to strengthen the frame and the pivot base. Arm 230 has an elongated slot 239.

The inboard end of the arm 230 is pivotally connected at 240 to a lever assembly 241 which is comprised of two side plates (FIG. 21) pivotally mounted at 242 to a forked bracket 243 mounted above the center frame section. A hydraulic cylinder 245 has its butt end pivotally mounted at 246 to the same base, and its rod end pivotally mounted at 247 to the lever assembly 241.

In operation, when the hydraulic cylinder 245 is retracted, the lever 241 is rotated clockwise from the position shown in FIG. 22. This places pivot 240 in the middle of the lost motion slot 239 and permits the wing frame to rotate freely up or down about pivot axis 33. Thus, the entire right wing frame in the use position is free to follow ground contour.

When it is desired to lock the wing frame for raising the lift frame to the transport position, the cylinder 245 is extended to the position shown in FIG. 22. This rotates the link 241 counterclockwise about pivot 242 which, in turn, translates the lost motion arm 230 to the left. As the pin 240 reaches the left limit of the slot 239, it locks the wing in the horizontal position and prevents it from lowering. However, the wing is still free to raise, should it engage an obstacle such as a levee.

The wing lock for the right frame section has similar elements than those described in connection with FIGS. 21 and 22 for locking that wing frame to the center frame section when it is desired to raise the lift frame. It will be observed that when the wing lock is locked as in FIG. 22, it is in an "over center" position and cannot be unlocked (i.e., the wing cannot be lowered) even if hydraulic pressure is lost. This is because the axis of pivot 242 is above a line passing between the axes of pivots 231 and 240 when arm 230 is in tension.

Figure 23:
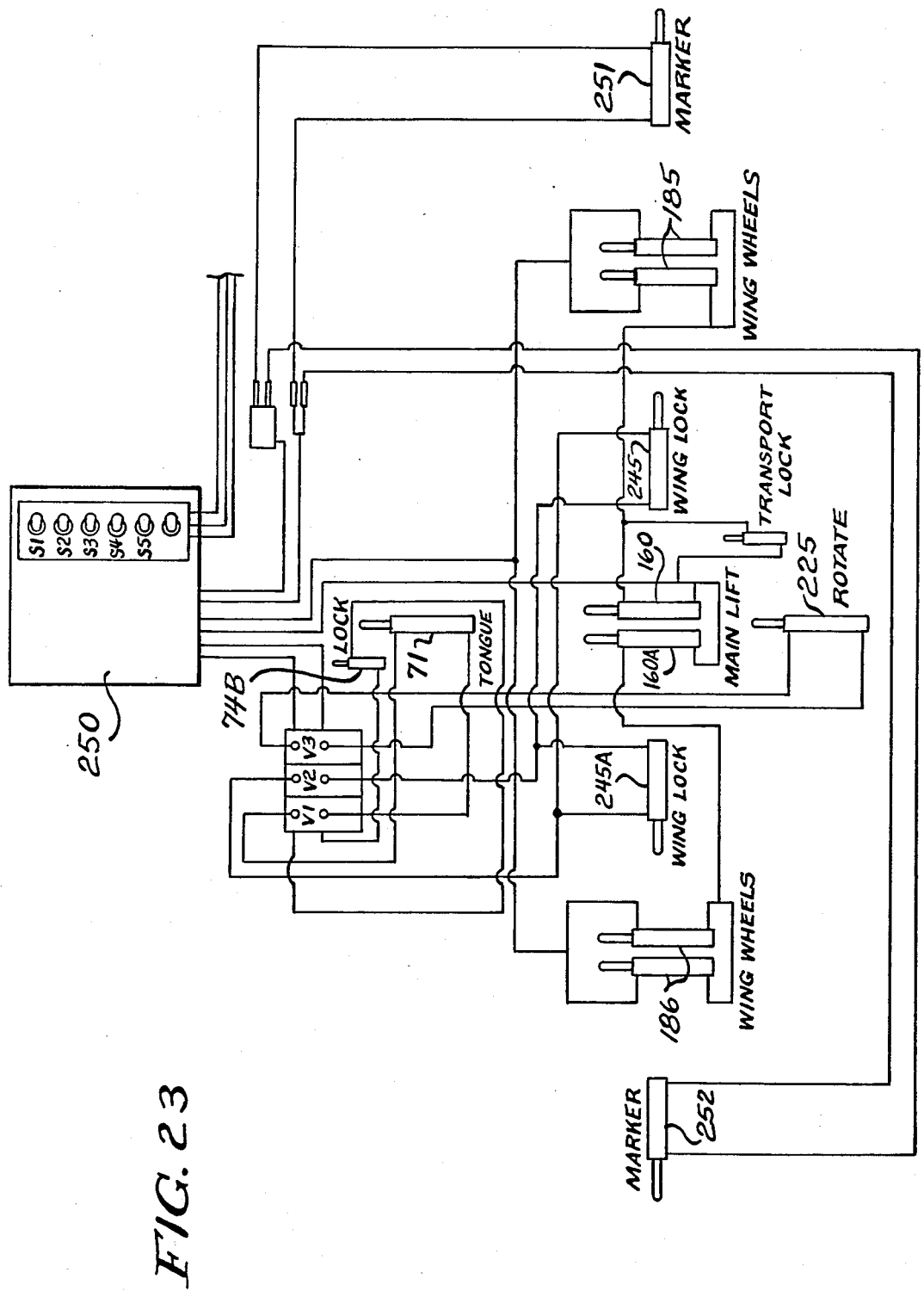
FIG. 23 is an hydraulic schematic diagram showing the various clyinders on the planter of FIG. 1.

Turning now to FIG. 23, there is shown an hydraulic schematic diagram of the various cylinders discussed above.

Reference numeral 250 designates a control panel at the operator's position on the tractor, and it includes six switches to which the operator has access. Those switches designated S-1 through S-3 are used to control solenoid valves designated V-1 through V-3 respectively. The switch S-4 is used to control the hydraulic cylinders designtaed 251 and 252 to raise and lower the right and left marker arms respectively such that when one marker arm is raised, the other is lowered, although they both may be raised for transport. The marker arms and their hydraulic controls form no part of the present invention although marker arms are required on a larger planter of this type.

Switch S-1 which controls valve V-1 is used to selectively extend or retract the tongue, and it controls hydraulic cylinders 71 as well as the smaller hydraulic cylinder 74B which unlocks the tongue lock 74 seen in FIG. 2. The cylinder 71 is substantially larger than cylinder 74B, so as soon as the switch S-1 is actuated to extend the tongue cylinder 71, the smaller cylinder 74B reacts much more quickly and raises the latch element 74A, permitting the tongue to extend.

Switch S-2 is used to actuate valve V-2 which in turns actuates the wing lock cylinders 245, 245A such that both lock cylinders are extended and retracted simultaneously.

Switch S-3 is used to control valve V-3 which actuates the swing cylinder 225 to rotate the lift frame about the pivot post assembly between the use and transport configurations.

The main lift cylinders 160 and 160A as well as the wing wheel lift cylinders 185 and 186 are shown in the same configuration described in connection with FIGS. 16–18, and they are controlled by a separate lever which actuates the lift cylinders for so long as the lever is actuated, either in an extend or a retract position. The switches S-1 through S-4, on the other hand, may be toggle switches.

It can now be appreciated by persons skilled in the art that the following factors contribute to a desirable balance of the weight of the planter between the carrier wheels, wing support wheels (in the use or intermediate position) and the tractor hitch. The wing frames are reduced in the fore-to-aft dimension—i.e., the mounting bars 37, 41 for the rear row units are moved forward. The rear mounting bar of the center section is arched and the row units are placed between the wheels for the carrier frame so that weight is also moved forward. The vertical axis of the pivot post assembly 50 is forward of the axis for the carrier frame wheels (i.e., between the tractor hitch and those wheels). There is symmetry (i.e., substantially equal weight) on left and right sides of the center line of the implement.

In this manner, the implement can be set up with rear row units and fertilizer, or it may also include front row units, and nevertheless exhibit a desirable weight balance in all normal positions of use or transport.

Having thus disclosed in detail a preferred embodiment of the invention, persons skilled in the art will be able to modify certain of the structure which has been illustrated or to substitute equivalent elements for those disclosed while continuing to practice the principles of the invention. It is thus intended that all such modifications and substitutions be covered as they are embraced within the spirit and scope of the appended claims.

I claim:

1. An agricultural implement adapted to be pulled by a tractor with a hitch and convertible between a use position and a transport position without unhitching from the tractor hitch, comprising: a carrier frame including a plurality of ground support wheels; draft tongue means connecting said carrier frame to the tractor hitch for permitting pivotal movement between said tractor and said implement about a first vertical hitch axis; lift frame means including a lift frame and plurality of work units spaced along said lift frame, said lift frame including at least an integral center frame section extending to either side of the centerline of the implement in the use position; mounting means for mounting said lift frame such that said center frame section thereof is rotatable about a second vertical axis of rotation; powered lift linkage means connecting said lift frame to said carrier frame for lifting said lift frame and said work units above said carrier frame to a raised position wherein all of said units are elevated above said support wheels; and power swing means for rotating said lift frame in said raised position about said second vertical axis between said use position and said transport position in which said lift frame is elongated in the direction of travel; and characterized in that the said second vertical axis of rotation is located such that the weight of said lift frame means is substantially uniformly distributed to either side thereof in the direction of elongation of said lift frame means.

2. The apparatus of claim 1 characterized in that said second vertical axis of rotation is substantially on the center line of said implement.

3. The apparatus of claim 1 wherein said draft tongue means includes first and second telescoping members, one of said members including means for connecting to said tractor hitch, the other of said members being connected to said carrier frame; and power means connected between said first and second telescoping members for operating the same between an extended and a retracted positions from the operator's position on said tractor.

4. The apparatus of claim 1 further comprising stabilizer means mounted on said carrier frame for engaging said lift frame means in the use position at a location spaced laterally from said second vertical axis of rotation for stabilizing said lift frame means in the use position and preventing the same from oscillating about said second vertical axis and for disengaging said lift frame means in said raised position to permit the same to rotate about said vertical axis of rotation.

5. The apparatus of claim 1 wherein said draft tongue means comprises a telescoping tongue and first power means for telescoping said tongue between an extended position when said lift frame is rotated to the transport position, and a retracted position when said lift frame is in the use position; and tongue latch means for locking said tongue in the retracted position when said lift frame is in the use position.

6. The apparatus of claim 5 further including second power means for unlatching said tongue latch means when it is desired to extend said tongue for transport.

7. The apparatus of claim 1 further comprising transport latch means carried by said tongue means for locking the forward end of said lift frame to said tongue in the transport position to said tongue.

8. The apparatus of claim 7 characterized in that said transport latch means may be released by telescoping said tongue means slightly, thereby to disengage said lift frame from said transport latch means.

9. The apparatus of claim 1 wherein said lift linkage means includes a pivot post mounted to said carrier frame and extending thereabove and defining said second vertical axis located proximate the center line of said implement; parallel linkage means interconnecting said lift frame with said pivot post; and main hydraulic cylinder means for actuating said linkage means to lift said lift frame to said raised position above said carrier frame.

10. The apparatus of claim 9 wherein said lift frame further includes first and second wing frame sections, each of said wing frame sections being mounted to an outboard end of said center frame section for pivotal motion in a vertical direction relative to said center frame section, said apparatus further comprising first and second wing lock means for locking said first and second wing frame sections respectively to said center frame section, whereby said lift frame is flexible when said wing lock means are in the unlocked position to permit said wing frame sections to adjust to the contour of the ground, and said wing frame sections may be locked to said center frame section by said wing lock means to prevent said wing frame sections from extending below said center frame section when said lift frame is raised.

11. The apparatus of claim 10 further including at least first and second wing support wheels on the outboard ends of said first and second wing frame sections respectively for supporting said wing frame sections when said lift frame is lowered for use; first and second slave cylinders associated respectively with said first and second wing support wheels and connected in a hydraulic circuit with said master hydraulic cylinder means, said master hydraulic cylinder means being a master cylinder extendable at the same rate as its associated one of said first and second slave cylinders, said master cylinders being extendable beyond the limits of extension of said slave cylinders, whereby said master and slave cylinders may be extended at a uniform rate to raise said lift frame to an intermediate position at which said slave cylinders reach the limits of their extension and said lift frame and the working units thereon are elevated above the ground to said intermediate position, said master cylinder being further extendable beyond said intermediate postion to a transport position to raise said wing support wheels off the ground to a transport height, whereby said lift frame may be rotated about said pivot post to the transport position.

12. The apparatus of claim 11 wherein each of said lift frame sections includes a forward mounting bar and a rear mounting bar and transverse frame members for forming a rigid frame section including said forward and rear mounting bars; some of said work units being mounted to said forward mounting bar and some of said work units being mounted to said rear mounting bar; and characterized in that said second vertical axis of rotation is located between said forward and rear mounting bars.

13. The apparatus of claim 12 wherein said rear mounting bar of said center frame section is arched and extends above the support wheels of said carrier frame; whereby the work units mounted on said rear mounting bar are located more forwardly than they otherwise would be.

14. The apparatus of claim 12 wherein said support wheel means for said carrier frame comprises a plurality of wheels mounted to said carrier frame and spaced laterally with their horizontal axes of rotation generally aligned, and wherein the second vertical axis of rotation of said pivot post is located substantially on the center line of said implement in the use position and forwardly of said horizontal axes of rotation of said carrier frame support wheel means.

15. The apparatus of claim 12 wherein said rear work units are row planting units and said forward units are row planting units spaced intermediate the positions of said rear row units, said apparatus further comprising fertilizer storage means mounted on said frame sections and including fertilzer furrow opening means associated with said fertilizer storage means and associated with the row units on said rear mounting bars, whereby when said apparatus is set up it may be operated with the rear row units to plant corn and with the rear and front row units to plant beans without changing the configuration of said row units once they are mounted to said mounting bars.

16. The apparatus of claim 11 wherein the support wheels on said carrier frame are laterally aligned with one another and said wing support wheels are laterally aligned with said support wheels of said carrier frame when said lift frame is raised to said intermediate position.

17. The apparatus of claim 16 characterized in that said wing support wheels are moved rearwardly between adjacent ones of said work units and are in lateral alignment with said work units when said lift frame is lowered to the use position.

18. The apparatus of claim 9 wherein said work units are ground-engaging units and further comprising control means for controlling said lift linkage means from the operator's position on the tractor to raise said lift frame to a first intermediate position in which said work units are raised out of ground engagement for end turns or to a second transport position higher than said intermediate position in which said work units are raised to a position sufficient to clear said carrier frame when said lift frame is rotated for transport.

19. The apparatus of claim 18 further comprising releasable latch means for automatically securing said lift frame means above said carrier frame when said lift frame means is raised to said transport position.

20. The apparatus of claim 19 wherein said releasable latch means includes an unlock hydraulic cylinder connected in circuit with said lift linkage means and assuming a first position when said lift frame means is first moved to said transport position such that said unlock hydraulic cylinder is incapable of releasing said latch means, said unlock hydraulic cylinder assuming a second, operative position when said lift linkage means is thereafter actuated to lower said lift frame means, said unlock hydraulic cylinder being thereafter operative to release said latch means when said lift linkage means is thereafter actuated to raise said lift frame means a second time.

21. The apparatus of claim 10 wherein each of said wing lock means when actuated permits its associated one of said wing frame sections to pivot upwardly relative to said center frame section but prevents its associated one of said wing frame section from pivoting below the horizontal level of said center frame section.

22. An agricultural implement adapted to be pulled by a tractor with a hitch and convertible between a use position and a transport position without unhitching from the tractor, comprising: a carrier frame including a plurality of ground support wheels; draft tongue means connected to said carrier frame for connecting said carrier frame to the tractor hitch for permitting pivotal movement between said tractor and said implement about a hitch axis; lift frame means including a laterally elongated integral lift frame and plurality of ground-engaging work units spaced along said lift frame, said lift frame being extended in a direction transverse of the direction of travel of said tractor when said lift frame is in the use position; powered lift linkage means connecting said lift frame to said carrier frame for selectively lifting said lift frame and said work units to a first raised position wherein said work units are above the ground to permit said implement to turn and to a second raised position above said first raised position, wherein all of said work units are above said carrier frame and above said ground support wheels in said second raised position; and power swing means for rotating said lift frame in said second raised position about a vertical axis between said use position and said transport position in which said lift frame is elongated in the direction of travel and characterized in that said vertical axis of rotation of said lift frame is substantially on the center line of said implement and proximate the mid-point of said lift frame in its direction of elongation and is located forwardly of at least two of said ground support wheels of said carrier frame.

23. The apparatus of claim 22 wherein said carrier frame wheels are laterally spaced and aligned; and said lift frame includes a first mounting bar extending above said carrier frame wheels, and further including means for mounting a plurality of said units to said mounting bar such that some of said units are located between said carrier frame wheels when said lift frame is lowered to the use position.

24. The apparatus of claim 23 wherein the implement is a planter and said units are planter row units; and wherein said lift frame means includes a center section frame including said mounting bar, and first and second wing frames each including further first mounting bars on which an additional plurality of said units are mounted; said apparatus characterized in that said mounting bars of said wing frames are located forwardly of the mounting bar of said center section frame.

25. The apparatus of claim 24 wherein each of said center and first and second wing frames further includes a forward mounting bar forward of said first mounting bars of said center frame and said first and second wing frames, all of said forward mounting bars being laterally aligned; and further including a further plurality of said planter row units mounted to each of said forward mounting bars at inter-plant positions relative to said rear row units on said first mounting bars of said center frame and said first and second wing frames.

* * * * *